United States Patent
Hari Haran et al.

(10) Patent No.: US 11,663,661 B2
(45) Date of Patent: May 30, 2023

(54) APPARATUS AND METHOD FOR TRAINING A SIMILARITY MODEL USED TO PREDICT SIMILARITY BETWEEN ITEMS

(71) Applicant: Telefonaktiebolaget LM Ericsson (publ), Stockholm (SE)

(72) Inventors: Alvin Jude Hari Haran, Sundbyberg (SE); Per-Erik Brodin, Los Gatos, CA (US); Meral Shirazipour, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 455 days.

(21) Appl. No.: 16/641,422

(22) PCT Filed: Aug. 24, 2018

(86) PCT No.: PCT/IB2018/056464
§ 371 (c)(1),
(2) Date: Feb. 24, 2020

(87) PCT Pub. No.: WO2019/038736
PCT Pub. Date: Feb. 28, 2019

(65) Prior Publication Data
US 2020/0226493 A1    Jul. 16, 2020

Related U.S. Application Data

(60) Provisional application No. 62/549,995, filed on Aug. 25, 2017.

(51) Int. Cl.
*G06F 16/20*    (2019.01)
*G06Q 40/03*    (2023.01)
(Continued)

(52) U.S. Cl.
CPC .......... *G06Q 40/03* (2023.01); *G06F 16/285* (2019.01); *G06F 16/35* (2019.01); *G06F 16/38* (2019.01); *G06N 20/00* (2019.01)

(58) Field of Classification Search
None
See application file for complete search history.

(56) References Cited

U.S. PATENT DOCUMENTS

| 6,266,649 B1 | 7/2001 | Linden et al. |
| 10,565,498 B1 * | 2/2020 | Zhiyanov ............... G06N 7/005 |

(Continued)

FOREIGN PATENT DOCUMENTS

WO    2015065590 A1    5/2015

OTHER PUBLICATIONS

McFee, B., "More Like This: Machine Learning Approaches to Music Similarity", University of California Dissertation, Jan. 1, 2012, pp. 1-186, University of California.
(Continued)

*Primary Examiner* — Jau Shya Meng
(74) *Attorney, Agent, or Firm* — Coats & Bennett, PLLC

(57) ABSTRACT

An apparatus and method are described herein for training a similarity model that is used to predict similarity between item pairs. In one example, the apparatus is configured to train (build) the similarity model by using machine learning (e.g., a multivariate multiple liner regression process) that utilizes an independent variable including metadata (e.g., title, genre, writer, plot keywords) associated with training items, and two dependent variables including user contributed similarity scores for training item pairs, and collaborative filtering similarity scores for the training item pairs. Then, the apparatus uses the trained model to predict similarity between items.

18 Claims, 13 Drawing Sheets

(51) Int. Cl.
*G06F 16/35* (2019.01)
*G06F 16/28* (2019.01)
*G06F 16/38* (2019.01)
*G06N 20/00* (2019.01)

(56) References Cited

U.S. PATENT DOCUMENTS

| | | | | |
|---|---|---|---|---|
| 10,853,867 | B1* | 12/2020 | Bulusu | G06Q 30/0631 |
| 2003/0037015 | A1* | 2/2003 | Aggarwal | G06F 16/2465 |
| | | | | 706/14 |
| 2003/0037025 | A1* | 2/2003 | Aggarwal | G06F 16/285 |
| 2005/0240413 | A1* | 10/2005 | Asano | G06F 40/30 |
| | | | | 704/270 |
| 2015/0127419 | A1 | 5/2015 | Tiwari et al. | |
| 2018/0068232 | A1 | 3/2018 | Hari Haran et al. | |
| 2018/0330270 | A1* | 11/2018 | Dorner | G06F 16/2462 |

OTHER PUBLICATIONS

Estes, Z. et al., "A Dual-Process Model of Brand Extension: Taxonomic Feature-Based and Thematic Relation-Based Similarity Independently Drive Brand Extension Evaluation", Journal of Consumer Psychology, vol. 22, Jan. 1, 2012, pp. 86-101, Elsevier.

McFee, B. et al., "Learning Content Similarity for Music Recommendation", IEEE Transactions on Audio, Speech, and Language Processing, vol. 20 No. 8, Oct. 8, 2012, pp. 2207-2218, IEEE.

Linden, G. et al., "Amazon.com Recommendations: Item-to-Item Collaborative Filtering", IEEE Internet Computing Industry Report, vol. 7 No. 1, Jan. 1, 2003, pp. 76-80, IEEE.

Sarwar, B. et al., "Item-Based Collaborative Filtering Recommendation Algorithms", The Tenth International Worid Nide Web Conference, May 1, 2001, pp. 1-11, International World Wide Web Conference Committee.

Melville, P. et al., "Content-Boosted Collaborative Filtering for Improved Recommendations", Proceedings of the Eighteenth National Conference on Artificial Intelligence (AAAI—2002), Jul. 1, 2002, pp. 187-192, American Association for Artificial Intelligence.

Sun, H. et al., "JacUOD: A New Similarity Measurement for Collaborative Filtering", Journal of Computer Science and Technology, vol. 27 No. 6, Nov. 1, 2012, pp. 1252-1260, Springer.

Liu, H. et al., "A New User Similarity Model to Improve the Accuracy of Collaborative Filtering", Knowledge-Based Systems, vol. 56, Jan. 1, 2014, pp. 156-166, Elsevier.

* cited by examiner

| ID | MOVIE 1 | MOVIE 2 | USER-CONTRIBUTED SIMILARITY SCORE | COLLABORATIVE FILTERING SIMILARITY SCORES |
|---|---|---|---|---|
| 1 | BATMAN BEGINS (2005) | THE DARK KNIGHT (2008) | 0.95 | 0.89 |
| 2 | BATMAN BEGINS (2005) | BATMAN RETURNS (1992) | 0.67 | 0.83 |
| 3 | BATMAN BEGINS (2005) | BATMAN V. SUPERMAN (2016) | 0.80 | 0.58 |

FIG. 2

| ID | MOVIE 1 | MOVIE 2 | USER-CONTRIBUTED SIMILARITY SCORE | COLLABORATIVE FILTERING SIMILARITY SCORES |
|---|---|---|---|---|
| 1 | M0001<br>TITLE: BATMAN BEGINS<br>YEAR: 2005<br>DIRECTOR: C. NOLAN<br>WRITER: D. GOYER, C. NOLAN | M0002<br>TITLE: THE DARK KNIGHT<br>YEAR: 2008<br>DIRECTOR: C. NOLAN<br>WRITER: J. NOLAN, C. NOLAN | 0.95 | 0.89 |
| 2 | M0001<br>TITLE: BATMAN BEGINS<br>YEAR: 2005<br>DIRECTOR: C. NOLAN<br>WRITER: D. GOYER, C. NOLAN | M0003<br>TITLE: BATMAN RETURNS<br>YEAR: 1992<br>DIRECTOR: T. BURTON<br>WRITER: D. WATERS | 0.67 | 0.83 |
| 3 | M0001<br>TITLE: BATMAN BEGINS<br>YEAR: 2005<br>DIRECTOR: C. NOLAN<br>WRITER: D. GOYER, C. NOLAN | M0004<br>TITLE: BATMAN V. SUPERMAN<br>YEAR: 2016<br>DIRECTOR: Z. SNYDER<br>WRITER: C. TERRIO, D. GOYER | 0.80 | 0.58 |

FIG. 3

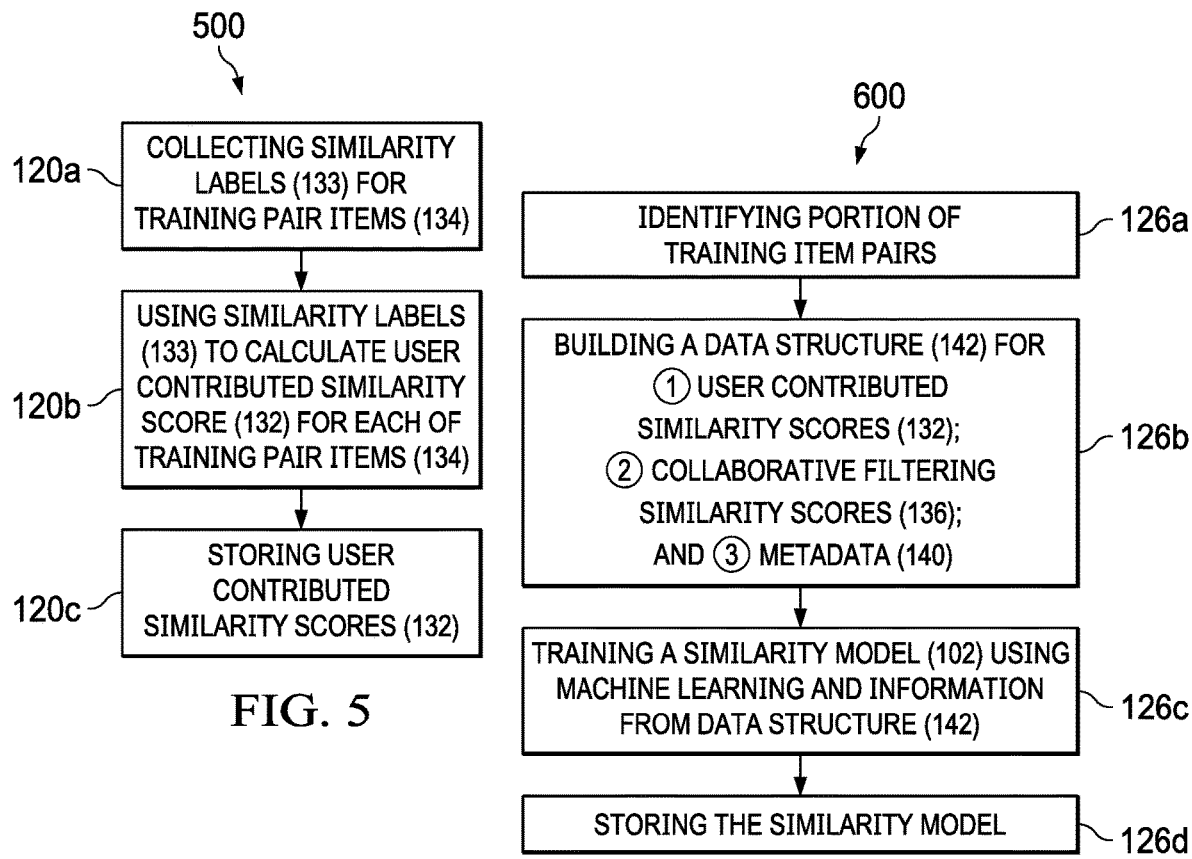
FIG. 5
FIG. 6
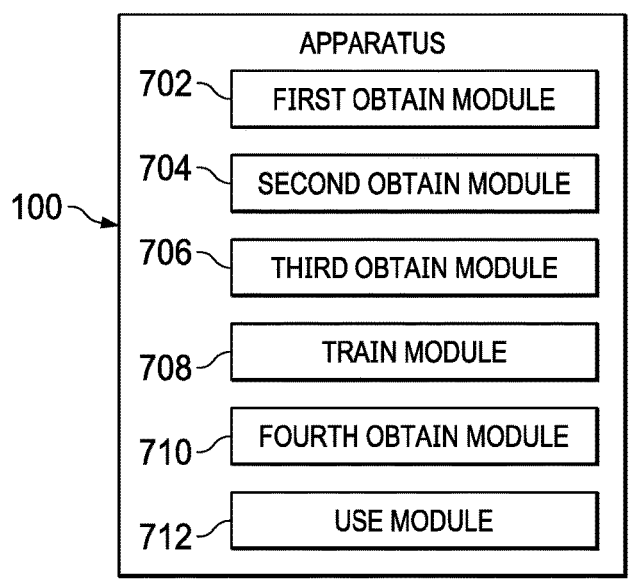
FIG. 7

| ID | MOVIE 1 | MOVIE 2 | USER CONTRIBUTED SIMILARITY SCORE |
|---|---|---|---|
| 1 | M0001<br>TITLE: BATMAN BEGINS<br>YEAR: 2005<br>DIRECTOR: C. NOLAN<br>WRITER: D. GOYER, C. NOLAN | M0002<br>TITLE: THE DARK KNIGHT<br>YEAR: 2008<br>DIRECTOR: C. NOLAN<br>WRITER: J. NOLAN, C. NOLAN | 0.95 |
| 2 | M0001<br>TITLE: BATMAN BEGINS<br>YEAR: 2005<br>DIRECTOR: C. NOLAN<br>WRITER: D. GOYER, C. NOLAN | M0003<br>TITLE: BATMAN RETURNS<br>YEAR: 1992<br>DIRECTOR: T. BURTON<br>WRITER: D. WATERS | 0.67 |
| 3 | M0001<br>TITLE: BATMAN BEGINS<br>YEAR: 2005<br>DIRECTOR: C. NOLAN<br>WRITER: D. GOYER, C. NOLAN | M0004<br>TITLE: BATMAN V. SUPERMAN<br>YEAR: 2016<br>DIRECTOR: Z. SNYDER<br>WRITER: C. TERRIO, D. GOYER | 0.80 |

FIG. 8A

| ID | MOVIE 1 | MOVIE 2 | USER CONTRIBUTED SIMILARITY SCORE |
|---|---|---|---|
| 1 | M0001<br>TITLE: BATMAN BEGINS<br>YEAR: 2005<br>DIRECTOR: C. NOLAN<br>WRITER: D. GOYER, C. NOLAN | M0002<br>TITLE: THE DARK KNIGHT<br>YEAR: 2008<br>DIRECTOR: C. NOLAN<br>WRITER: J. NOLAN, C. NOLAN | 0.95 |
| 2 | M0001<br>TITLE: BATMAN BEGINS<br>YEAR: 2005<br>DIRECTOR: C. NOLAN<br>WRITER: D. GOYER, C. NOLAN | M0003<br>TITLE: BATMAN RETURNS<br>YEAR: 1992<br>DIRECTOR: T. BURTON<br>WRITER: D. WATERS | 0.67 |
| 3 | M0001<br>TITLE: BATMAN BEGINS<br>YEAR: 2005<br>DIRECTOR: C. NOLAN<br>WRITER: D. GOYER, C. NOLAN | M0004<br>TITLE: BATMAN V. SUPERMAN<br>YEAR: 2016<br>DIRECTOR: Z. SNYDER<br>WRITER: C. TERRIO, D. GOYER | 0.80 |
| 4 | M0001<br>TITLE: BATMAN BEGINS<br>YEAR: 2005<br>DIRECTOR: C. NOLAN<br>WRITER: D. GOYER, C. NOLAN | M0005<br>TITLE: WONDER WOMAN<br>YEAR: 2017<br>DIRECTOR: P. JENKINS<br>WRITER: A. HEINBERG, Z. SNYDER | ?? |

FIG. 8B

| ID | MOVIE 1 (134) | MOVIE 2 (134) | COLLABORATIVE FILTERING SIMILARITY SCORES (136) |
|---|---|---|---|
| 1 | M0001<br>TITLE: BATMAN BEGINS<br>YEAR: 2005<br>DIRECTOR: C. NOLAN<br>WRITER: D. GOYER, C. NOLAN | M0002<br>TITLE: THE DARK KNIGHT<br>YEAR: 2008<br>DIRECTOR: C. NOLAN<br>WRITER: J. NOLAN, C. NOLAN | 0.89 |
| 2 | M0001<br>TITLE: BATMAN BEGINS<br>YEAR: 2005<br>DIRECTOR: C. NOLAN<br>WRITER: D. GOYER, C. NOLAN | M0003<br>TITLE: BATMAN RETURNS<br>YEAR: 1992<br>DIRECTOR: T. BURTON<br>WRITER: D. WATERS | 0.83 |
| 3 | M0001<br>TITLE: BATMAN BEGINS<br>YEAR: 2005<br>DIRECTOR: C. NOLAN<br>WRITER: D. GOYER, C. NOLAN | M0004<br>TITLE: BATMAN V. SUPERMAN<br>YEAR: 2016<br>DIRECTOR: Z. SNYDER<br>WRITER: C. TERRIO, D. GOYER | 0.58 |
| | ○ ○ ○ | | |

FIG. 8C

| ID | MOVIE 1 | MOVIE 2 | COLLABORATIVE FILTERING SIMILARITY SCORES |
|---|---|---|---|
| 1 | M0001<br>TITLE: BATMAN BEGINS<br>YEAR: 2005<br>DIRECTOR: C. NOLAN<br>WRITER: D. GOYER, C. NOLAN | M0002<br>TITLE: THE DARK KNIGHT<br>YEAR: 2008<br>DIRECTOR: C. NOLAN<br>WRITER: J. NOLAN, C. NOLAN | 0.89 |
| 2 | M0001<br>TITLE: BATMAN BEGINS<br>YEAR: 2005<br>DIRECTOR: C. NOLAN<br>WRITER: D. GOYER, C. NOLAN | M0003<br>TITLE: BATMAN RETURNS<br>YEAR: 1992<br>DIRECTOR: T. BURTON<br>WRITER: D. WATERS | 0.83 |
| 3 | M0001<br>TITLE: BATMAN BEGINS<br>YEAR: 2005<br>DIRECTOR: C. NOLAN<br>WRITER: D. GOYER, C. NOLAN | M0004<br>TITLE: BATMAN V. SUPERMAN<br>YEAR: 2016<br>DIRECTOR: Z. SNYDER<br>WRITER: C. TERRIO, D. GOYER | 0.58 |
| 4 | M0001<br>TITLE: BATMAN BEGINS<br>YEAR: 2005<br>DIRECTOR: C. NOLAN<br>WRITER: D. GOYER, C. NOLAN | M0006<br>TITLE: THE AVENGERS<br>YEAR: 2012<br>DIRECTOR: J. WHEDON<br>WRITER: J. WHEDON, Z. PENN | ?? |

| ID | MOVIE 1 — 134 | MOVIE 2 — 134 | USER CONTRIBUTED SIMILARITY SCORE — 132 | COLLABORATIVE FILTERING SIMILARITY SCORES — 136 |
|---|---|---|---|---|
| 1 | M0001<br>TITLE: BATMAN BEGINS<br>YEAR: 2005<br>DIRECTOR: C. NOLAN<br>WRITER: D. GOYER, C. NOLAN | M0002<br>TITLE: THE DARK KNIGHT<br>YEAR: 2008<br>DIRECTOR: C. NOLAN<br>WRITER: J. NOLAN, C. NOLAN | 0.95 | 0.89 |
| 2 | M0001<br>TITLE: BATMAN BEGINS<br>YEAR: 2005<br>DIRECTOR: C. NOLAN<br>WRITER: D. GOYER, C. NOLAN | M0003<br>TITLE: BATMAN RETURNS<br>YEAR: 1992<br>DIRECTOR: T. BURTON<br>WRITER: D. WATERS | 0.67 | 0.83 |
| 3 | M0001<br>TITLE: BATMAN BEGINS<br>YEAR: 2005<br>DIRECTOR: C. NOLAN<br>WRITER: D. GOYER, C. NOLAN | M0004<br>TITLE: BATMAN V. SUPERMAN<br>YEAR: 2016<br>DIRECTOR: Z. SNYDER<br>WRITER: C. TERRIO, D. GOYER | 0.80 | 0.58 |

| | | | |
|---|---|---|---|
| 4 | M0001<br>TITLE: BATMAN BEGINS<br>YEAR: 2005<br>DIRECTOR: C. NOLAN<br>WRITER: D. GOYER, C. NOLAN | M0005<br>TITLE: WONDER WOMAN ～144<br>YEAR: 2017<br>DIRECTOR: P. JENKINS<br>WRITER: A. HEINBERG, Z. SNYDER | ?? | 0.92 |
| 5 | M0001<br>TITLE: BATMAN BEGINS<br>YEAR: 2005<br>DIRECTOR: C. NOLAN<br>WRITER: D. GOYER, C. NOLAN | M0006<br>TITLE: THE AVENGERS ～144<br>YEAR: 2012<br>DIRECTOR: J. WHEDON<br>WRITER: J. WHEDON, Z. PENN | 0.67 | ?? |
| 6 | M0001<br>TITLE: BATMAN BEGINS<br>YEAR: 2005<br>DIRECTOR: C. NOLAN<br>WRITER: D. GOYER, C. NOLAN | M0007<br>TITLE: JUSTICE LEAGUE ～144<br>YEAR: 2017<br>DIRECTOR: Z. SNYDER<br>WRITER: Z. SNYDER, C. TERRIO | ?? | ?? |

FROM FIG. 8E-1

| ID | MOVIE 1 — 134 | MOVIE 2 — 134 | USER CONTRIBUTED SIMILARITY SCORE — 132 | COLLABORATIVE FILTERING SIMILARITY SCORES — 136 |
|---|---|---|---|---|
| 1 | M0001<br>TITLE: BATMAN BEGINS<br>YEAR: 2005<br>DIRECTOR: C. NOLAN<br>WRITER: D. GOYER, C. NOLAN | M0002<br>TITLE: THE DARK KNIGHT<br>YEAR: 2008<br>DIRECTOR: C. NOLAN<br>WRITER: J. NOLAN, C. NOLAN | 0.95 | 0.89 |
| 2 | M0001<br>TITLE: BATMAN BEGINS<br>YEAR: 2005<br>DIRECTOR: C. NOLAN<br>WRITER: D. GOYER, C. NOLAN | M0003<br>TITLE: BATMAN RETURNS<br>YEAR: 1992<br>DIRECTOR: T. BURTON<br>WRITER: D. WATERS | 0.67 | 0.83 |
| 3 | M0001<br>TITLE: BATMAN BEGINS<br>YEAR: 2005<br>DIRECTOR: C. NOLAN<br>WRITER: D. GOYER, C. NOLAN | M0004<br>TITLE: BATMAN V. SUPERMAN<br>YEAR: 2016<br>DIRECTOR: Z. SNYDER<br>WRITER: C. TERRIO, D. GOYER | 0.80 | 0.58 |

TO FIG. 8F-2

FROM FIG. 8F-1

| | | | |
|---|---|---|---|
| 4 | M0001<br>TITLE: BATMAN BEGINS<br>YEAR: 2005<br>DIRECTOR: C. NOLAN<br>WRITER: D. GOYER, C. NOLAN | M0005 ~144<br>TITLE: WONDER WOMAN<br>YEAR: 2017<br>DIRECTOR: P. JENKINS<br>WRITER: A. HEINBERG, Z. SNYDER | PREDICTED: 0.99 | ACTUAL: 0.92<br>PREDICTED: 0.80 |
| 5 | M0001<br>TITLE: BATMAN BEGINS<br>YEAR: 2005<br>DIRECTOR: C. NOLAN<br>WRITER: D. GOYER, C. NOLAN | M0006 ~144<br>TITLE: THE AVENGERS<br>YEAR: 2012<br>DIRECTOR: J. WHEDON<br>WRITER: J. WHEDON, Z. PENN | ACTUAL: 0.67<br>PREDICTED: 0.80 | PREDICTED: 0.6 |
| 6 | M0001<br>TITLE: BATMAN BEGINS<br>YEAR: 2005<br>DIRECTOR: C. NOLAN<br>WRITER: D. GOYER, C. NOLAN | M0007 ~144<br>TITLE: JUSTICE LEAGUE<br>YEAR: 2017<br>DIRECTOR: Z. SNYDER<br>WRITER: Z. SNYDER, C. TERRIO | PREDICTED: 0.73 | PREDICTED 0.80 |

APPARATUS AND METHOD FOR TRAINING A SIMILARITY MODEL USED TO PREDICT SIMILARITY BETWEEN ITEMS

CLAIM OF PRIORITY

This application claims the benefit of priority to U.S. Provisional Patent Application No. 62/549,995, filed Aug. 25, 2017, the disclosure of which is fully incorporated herein by reference.

TECHNICAL FIELD

The present disclosure relates to an apparatus and method for training a similarity model that is used to predict similarity between items. In one example, the apparatus is configured to train (build) the similarity model by using multivariate machine learning (e.g., a multivariate multiple liner regression process) that utilizes one or more independent variables including metadata (e.g., title, genre, writer, plot keywords) associated with training items, and two dependent variables including user contributed similarity scores for training item pairs, and collaborative filtering similarity scores for the training item pairs. Then, the apparatus uses the trained model to predict similarity between items.

BACKGROUND

The following abbreviations are herewith defined, at least some of which are referred to within the following description of the present disclosure.
  DV Dependent Variable
  IV Independent Variable
  CF Collaborative Filtering
  CB Content-Based
  TP True positive
  FP False positive
  AI Artificial Intelligence
  ML Machine Learning Online stores usually have many items, and finding the most relevant item is often quite difficult. To address this issue, many stores employ some form of intelligence to guide users to the most relevant items, often in a personalised manner. One such example of this intelligence is a recommender system which recommends items to users which the recommender system predicts are most relevant based on the users behaviour. Another example of this intelligence is to display similar items, sometimes referred to as "More Like This". "You may also like", "Related" etc. . . . In this example, the user will select one particular item, and the system will show a list of items alongside (or below) the selected item, with headings such as "More Like This", "Similar to this", "You may also like", "Related" etc. . . . Examples of this intelligence are seen in systems including Google Play, Netflix, and Amazon among others.

The two most common methods used in recommender systems are Content-Based Filtering (CB) and Collaborative Filtering (CF). CB uses metadata of the items to provide recommendations, for example in a Video on Demand System (VoD) where the content is movies, the VoD system could look at which genre and director is most often consumed by the user, and recommend other movies by the same director in the same genre. CF uses consumption behavior or ratings of other items in the system irrespective of the metadata to provide recommendations. For example if everyone who liked Batman v. Superman also liked Man of Steel, then a user who watched the former would be recommended the latter. CB's strength is that it only uses descriptions or metadata of the item, which is generally provided by the content supplier or can be obtained from the content supplier or another source with little effort. Plus, in CB the descriptions or metadata of an item can be used without prior user consumption of the items, which is especially important in new systems, and for new items which have yet not been consumed by users or otherwise interacted with by users. CF's strength is in the fact that it uses real interactions from real human users, which has often led to better recommendations when compared to CB.

From a computational perspective, items are often considered similar if they are referenced by the same items. Both CB and CF used for predicting recommendations can also be used to predict similarity by analyzing these references. CB would consider two items similar if it references the same metadata, and CF would consider two items similar if it references the same users. For example, in a VoD system two movies could be considered similar by CB if they share the same genre, director, and cast. CF would consider two items similar if they are both consumed, liked, and/or disliked by same users, for example, if every user who enjoyed movie A also enjoyed movie B, then the system can infer that movie A and movie B somehow must be similar to one another. The CF approach to similarity as used by Amazon has been demonstrated to be useful in academia and industry, see G. Linden et. al. "Amazon.com Recommendations: Item-to-Item Collaborative Filtering" IEEE Internet Computing Industry Report, January-February 2003 (the contents of which are incorporated herein by reference).

It is quite common for systems to first estimate the weights or relative importance of each feature or metadata for items, and then to calculate the item-to-item similarity as a weighted attribute match. For an example of this type of weighted system, see U.S. Patent Application Publication No. US 2015/0127419 A1 (the contents of which are incorporated herein by reference). This system generally requires user-contributed labels as a dependent variable (DV). An alternative way was to use the CF similarity measurement (user-contributed labels) as a DV was discussed in B. McFee et. al. "Learning Content Similarity for Music Recommendation' IEEE Transactions on Audio, Speech, and Language processing, Volume 20, No. 8, October 2012 (the contents of which are incorporated herein by reference). However, there are no solutions that combine the teachings of US 2015/0127419 A1 and B. McFee's paper and have a system with the two DVs. There are hybrid recommender systems, including the popular hybrid recommender system disclosed in P. Melville "Content-Boosted Collaborative Filtering for Improved Recommendations" Proceedings of the Eighteenth National Conference on Artificial Intelligence (AAAI-2002), pp. 187-192, Edmonton, Canada, July 2002 (the contents of which are incorporated herein by reference). However, these recommender systems are hybridised in the input (IV) which may be suitable for predicting recommendations but is less desirable in predicting similarity.

There is an important distinction to realize between item-item similarity and recommender systems. The item-item similarity involves selecting a particular item and having the system recommend other items similar to the first item. This recommendation is independent of the user initiating the item. Further, item-item similarity is also related to Information Retrieval; the most popular Information Retrieval system is Google Search, where users put in a textual input and receive textual output most relevant to the input. In this case of item-item similarity the user inputs an item and receives a list of similar items. Hence, the item-item similarity approach is occasionally referred to as "Query by Example". In contrast, the recommender systems are generally personalized, tied very closely to the users, and do not require the user to select an item before providing a recommendation. Instead, the users' history is used by the recommender system to build a profile, and then to recommend items which the recommender system believes that the user will prefer.

There are a few problems with the CF approach to similarity in general as follows:
1. First, CF does not actually inform a user that two items are similar but instead informs the user that two items are related. For example, assume users who enjoyed the movie Avatar also enjoyed the movie Captain America, then those movies may be related in the sense that they were both enjoyed by the users, but that may not translate into those two movies being perceived as similar by most users. In fact, experiments have been conducted that showed that users agreed with CF models about 55% of the time at best. In contrast, a supervised CB model trained on similarity labels collected from 14 users gave a precision of about 67%. Basically, CF has traditionally been better at providing good recommendations, while CB has been shown to be better for similarity if and when it is built with human judgment as labels. So, broadly speaking the ranking of similarity methods are as follows from worst to best: (i) CB without labels; (ii) CF; and (iii) CB with labels.
2. Second, CF requires some consumption behaviour to prevent what is referred to in this field as the 'cold-start problem'. The cold-start problem relates to any item that has not been interacted with, has not been consumed, or has not had any user submitted ratings which means that item does not have any useful similarity metrics. Additionally, if too few people have interacted with the item, the similarity judgements can be very wrong.

There are a few problems with the CB approach to similarity in general as follows:
1. First, CB generally finds the most obvious items only. For example, if a user selects the movie Batman Begins (2005), then that user may be informed that the movies The Dark Knight (2008) and Batman Returns (1992) are the most similar to Batman Begins (2005). The CB model could make this prediction based on the fact that they have the same genre (Fantasy, Crime) and the same keywords ("Batman", "Bruce Wayne", "Gotham City"). While this prediction is technically correct, it is also very obvious. Presumably someone who is interested in the Batman movies is also aware of previous Batman movies, as well as the sequels.
2. Second, CB which requires ground truth (e.g., labels) works well, where the ground truth indicates the degree of similarity between a corpus of items. The ground truth could be in the form of similarity labels collected from users, crowd-sourced from anonymous workers, or submitted by experts. For a discussion about this reference is made to U.S. patent application Ser. No. 15/467,362 filed Mar. 23, 2017 and entitled "Expert-Assisted Online-Learning for Media Similarity" (the contents of which are incorporated herein by reference). However, the collection of ground truth could additionally introduce human bias in the assessment of similarity between the items since different people have different definitions of similarity and may not always agree if two items are similar. Plus, the same person could also provide different labels to the same questions at different points in their life, based on new experiences or knowledge.

It should be appreciated that some of the CB problems can be addressed by collecting ground truth labels from people. One way to do this is to simply show users two movies and ask them if they believe these movies are similar. The user feedback could then be used to build better CB methods by, for example, learning which features/metadata or combination of features/metadata leads people to believe movies are similar. However, even this approach which is generally useful still has a few drawbacks as follows:
1. First is scalability. Let's consider the domain of movies again. Hollywood alone releases about 300 movies a year. If a system has a library of 30,000 movies, then that means the system may need in the range of 900,000,000 annotations to be fully covered. This is required because the subjectivity of human perception towards similarity means that many labels are needed to temper the results. Further, assume that the system has five annotators (users) which submit judgements on the similarity of movies, and if you take the average, then the system would need about 4.5 billion labels in total to be fully covered and correct (e.g., with 30,000 movies need 30,000×30,000=900,000,000 comparisons). It is possible to train a similarity model on a subset of judgements, but this requires the metadata to be more accurate than it generally is, and even so it's results will still be less accurate because this subset will only contain those items known to the annotators, which could potentially leave out less popular items or those items generally consumed by a completely different demographic such as those in a different age group, gender, language, or country from the annotators.
2. Second, the user-contributed similarity model is subject to human bias. This happens because the person(s) creating the metadata has an influence on the metadata and could introduce a bias. For example, the movie Batman Begins is listed with different genres on different platforms. In Google Play Movies, it has the genres "Fantasy" and "Crime Film", while in Netflix it has many genres, including "Action & Adventure", "Comic Book and Superhero Movies", "Sci-Fi & Fantasy". The genres could also be listed differently on the same platforms. For example, in Google Play Movies the movie The Dark Knight which is the sequel to Batman Begins has the genres "Crime Film" and "Drama". This characterization removes the "Fantasy" and adds "Drama" compared to Batman Begins, despite the two movies are part of a trilogy of Batman movies. Additionally, not all genres are equal in meaning or perception. For example, the genre "Drama" is quite a generic term, and almost 50% of all movies have this genre attached. Meanwhile the genre "Country & Western" refers to a very particular type of movie. Likewise, people may not necessarily see a difference between two genres such as "Horror" and "Thriller". Some languages even have different words for different types of horror movies. Another form of user-bias is in the person(s) contributing similarity judgements. These people may be from a specific sample group which could make the results not general to the population. That is, these users may have different perception of what makes two items 'similar' when compared to the general population.

In view of at least the foregoing, it can be seen that there is a need to address the aforementioned problems and other problems associated with training a similarity model that is used to predict similarity between item pairs. This need and other needs are satisfied by the present disclosure.

SUMMARY

An apparatus and a method which address the aforementioned problems are described in the independent claims. Advantageous embodiments of the apparatus, and the method are further described in the dependent claims.

In one aspect, the present disclosure provides an apparatus configured to train a similarity model that is used to predict similarity between items. The apparatus comprises a processor and a memory that stores processor-executable instructions, wherein the processor interfaces with the memory to execute the processor-executable instructions, whereby the apparatus is operable to perform a first obtain operation, a second obtain operation, a third obtain operation, a train operation, a fourth obtain operation, and a use operation. In the first obtain operation, the apparatus obtains a plurality of user contributed similarity scores for a plurality of training item pairs, wherein one of the user contributed similarity scores corresponds to one of the training item pairs. In the second obtain operation, the apparatus obtains a plurality of collaborative filtering similarity scores for the plurality of training items pairs, wherein one of the collaborative filtering similarity scores corresponds to one of the training item pairs. In the third obtain operation, the apparatus obtains metadata for each item associated with the plurality of training item pairs. In the train operation, the apparatus builds the similarity model using: (1) at least portion of the user contributed similarity scores for the training item pairs; (2) at least a portion a of the collaborative filtering similarity scores for the training item pairs; and (3) at least a portion of the metadata for each item associated with the training item pairs. In the fourth obtain operation, the apparatus obtains items. In the use operation, the apparatus uses the similarity model to estimate a plurality of similarity scores for a plurality of pairs of the obtained items. The apparatus by performing these operations is able to provide a better user experience by enabling the recommendation of more relevant items.

In another aspect, the present disclosure provides a method in an apparatus for training a similarity model that is used to predict similarity between items. The method comprises a first obtaining step, a second obtaining step, a third obtaining step, a training step, a fourth obtaining step, and a using step. In the first obtaining step, the apparatus obtains a plurality of user contributed similarity scores for a plurality of training item pairs, wherein one of the user contributed similarity scores corresponds to one of the training item pairs. In the second obtaining step, the apparatus obtains a plurality of collaborative filtering similarity scores for the plurality of training items pairs, wherein one of the collaborative filtering similarity scores corresponds to one of the training item pairs. In the third obtaining step, the apparatus obtains metadata for each item associated with the plurality of training item pairs. In the training step, the apparatus builds the similarity model using: (1) at least portion of the user contributed similarity scores for the training item pairs; (2) at least a portion a of the collaborative filtering similarity scores for the training item pairs; and (3) at least a portion of the metadata for each item associated with the training item pairs. In the fourth obtaining step, the apparatus obtains items. In the using step, the apparatus uses the similarity model to estimate a plurality of similarity scores for a plurality of pairs of the obtained items. The method is able to provide a better user experience by enabling the recommendation of more relevant items.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIG. 2 is a diagram that illustrates an exemplary data structure (e.g., matrix) that can be used to train the similarity model in accordance with an embodiment of the present disclosure;

FIG. 3 is a diagram that illustrates another more detailed exemplary data structure (e.g., matrix) that can be used to train the similarity model in accordance with an embodiment of the present disclosure;

FIG. 5 is a flowchart of a method illustrating exemplary steps associated with the first obtaining step of FIG. 4 in accordance with an embodiment of the present disclosure;

FIG. 6 is a flowchart of a method illustrating exemplary steps associated with the training step of FIG. 4 in accordance with an embodiment of the present disclosure;

FIG. 7 is a block diagram illustrating an exemplary structure of the apparatus in accordance with an embodiment of the present disclosure;

FIG. 8A is a diagram that illustrates an exemplary data structure that is used to help explain the training and use of a similarity model which has an IV and two DVs in accordance with an embodiment of the present disclosure;

FIG. 8B is a diagram that illustrates an exemplary data structure that is used to help explain the training and use of a similarity model which has an IV and two DVs in accordance with an embodiment of the present disclosure;

FIG. 8C is a diagram that illustrates an exemplary data structure that is used to help explain the training and use of a similarity model which has an IV and two DVs in accordance with an embodiment of the present disclosure;

FIG. 8D is a diagram that illustrates an exemplary data structure that is used to help explain the training and use of a similarity model which has an IV and two DVs in accordance with an embodiment of the present disclosure;

FIGS. 8E-1 and 8E-2 is a diagram that illustrates an exemplary data structure that is used to help explain the training and use of a similarity model which has an IV and two DVs in accordance with an embodiment of the present disclosure; and, FIGS. 8F-1 and 8F-2 is a diagram that illustrates an exemplary data structure that is used to help explain the training and use of a similarity model which has an IV and two DVs in accordance with an embodiment of the present disclosure.

DETAILED DESCRIPTION

Figure 1:
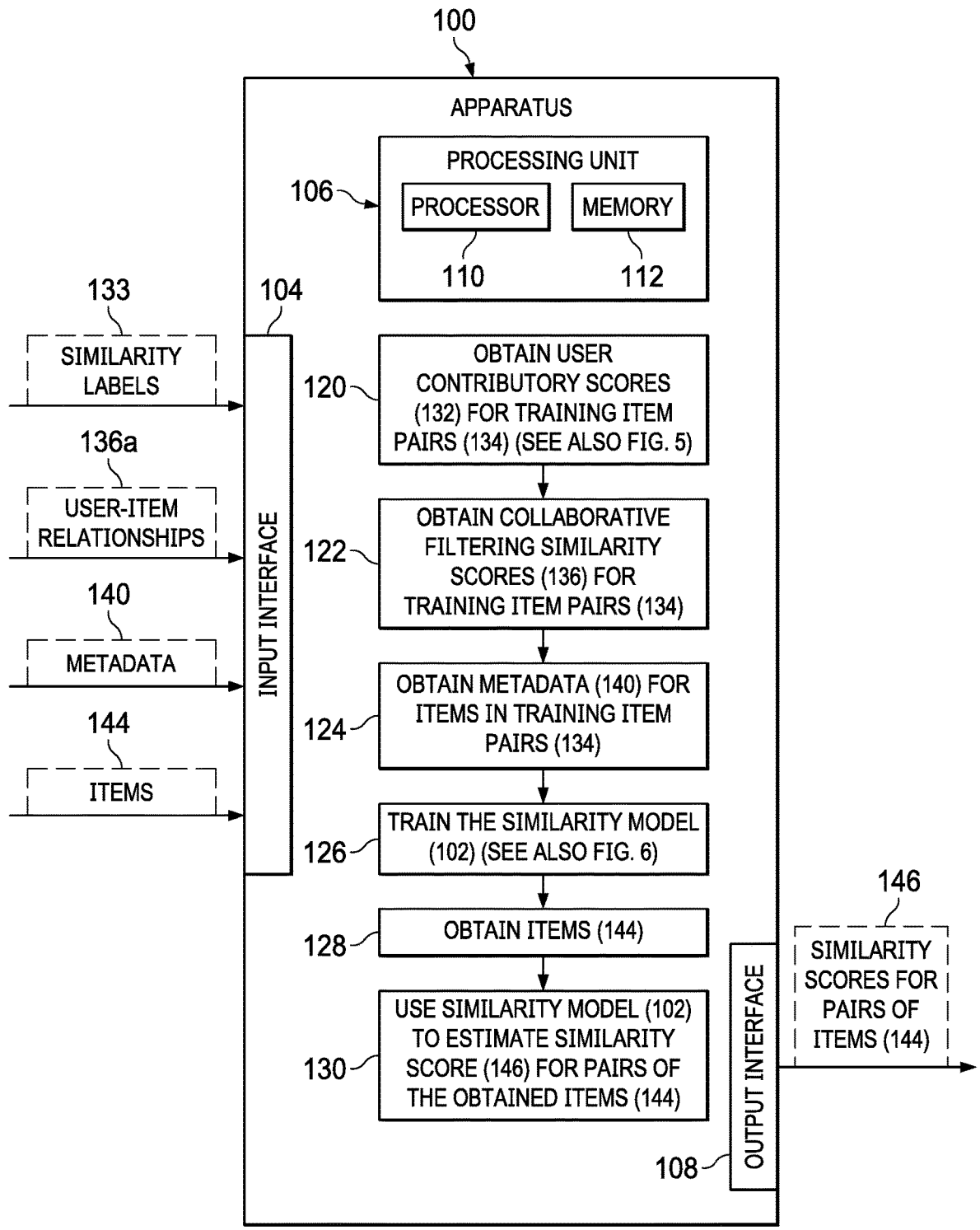
FIG. 1 a diagram of an exemplary apparatus configured to train a similarity model which is then used to predict similarity between item pairs in accordance with an embodiment of the present invention.

Referring to FIG. 1, there is a diagram of an exemplary apparatus 100 configured to train a similarity model 102 which is then used to predict similarity between item pairs 144 in accordance with an embodiment of the present invention. The apparatus 100 includes an input interface 104, a processing unit 106, and an output interface 108. In this example, the processing unit 106 includes a processor 110 which executes process-executable instructions stored in a memory 112 to enable the operations described below with respect to training the similarity model 102 and using the trained similarity model 102 to predict similarity between pairs of item 144. The apparatus 100 may include other components which are well known in the art but for clarity those well known components are not described herein while the processing unit 106 and the operations performed thereby in training and using the similarity model 102 which are relevant to the present disclosure are described in detail herein. The apparatus 100 can be a stand-alone device (e.g., with an output which is basically an Item Description page of an online catalog which is where a list of similar items is shown) or part of a system (e.g., VoD system, online retailer, e-commerce, music store, app store).

In one embodiment, the apparatus 100 comprises the processor 110 which executes process-executable instructions stored in to memory 112 to enable a first obtain operation 120, a second obtain operation 122, a third obtain operation 124, a train operation 126, a fourth obtain operation 128, and a use operation 130. In particular, the apparatus 100 can be operable to: (1) obtain user contributed similarity scores 132 for training item pairs 134, wherein one of the user contributed similarity scores 132 corresponds to one of the training item pairs 134 (first obtain operation 120); (2) obtain collaborative filtering similarity scores 136 for the training items pairs 134, wherein one of the collaborative filtering similarity scores 136 corresponds to one of the training item pairs 134 (second obtain operation 122) (note: the collaborative filtering similarity scores 136 are calculated from the received user-item relationships 136a—see discussion below); (3) obtain metadata 140 for each item 134 associated with the plurality of training item pairs 134 (third obtain operation 124); (4) train the similarity model 102 using: (i) at least portion of the user contributed similarity scores 132 for the training item pairs 134; (ii) at least a portion of the collaborative filtering similarity scores 136 for the training item pairs 134; and (iii) at least a portion of the metadata 140 for each item 134 associated with the training item pairs 134 (train operation 126); (4) obtain items 144 (fourth obtain operation 128); and (5) use the similarity model 102 to estimate similarity scores 146 for pairs of the obtained items 144 (use operation 130). These operations 120, 122, 124, 126, 128, and 130 are discussed in detail next.

In the first obtain operation 120, the apparatus 100 obtains user contributed similarity scores 132 for training item pairs 134, where each one of the user contributed similarity scores 132 corresponds to one of the training item pairs 134 (i.e., each training item pair 134 has a corresponding user contributed similarity score 132). In one example, the apparatus 100 can obtain the user contributed similarity scores 132 for training item pairs 134 as follows: (1) collect similarity labels 133 from users (annotators) for each of the training item pairs 134 (note: the similarity labels 133 would be received at the input interface 104) (step 120a); (2) use the collected similarity labels 133 to calculate the user contributed similarity score 132 for each of the training item pairs 134 (step 120b); and (3) store the user contributed similarity scores 132 in relation to their respective training item pairs 134 (step 120c) (see FIG. 4). The collection of the similarity labels 133 in step 120a can be obtained in several ways such as, for example, from crowd-sourced by volunteers, or from crowd-workers through dedicated sites such as Amazon Mechanical Turk, or from experts in the field. It should be noted that the collection of similarity labels 133 is commonly done in the field of music similarity (or Music Information Retrieval) for the purpose of collecting similarity ground truth. For more details about this type of collection of music similarity labels, reference is made to the aforementioned B. McFee "Learning Content Similarity for Music Recommendation' IEEE transactions on audio, speech, and language processing 20.8 (2012): 2207-2218, and B. McFee "More like this: Machine Learning Approaches to Music Similarity" dissertation submitted to University of California, San Diego, 2012, 186 pages (the contents of these documents are incorporated herein by reference). Further, once the apparatus 100 has collected the similarity labels 133, then the apparatus 100 can calculate per step 120b the user contributed similarity scores 132. For instance, the calculation of the user contributed similarity scores 132 can be dependent on how similarity is represented in the collected similarity labels 133. In this regard, if users in the collecting step 120a are allowed to submit one of two judgements: similar (TP), or not similar (FP), then the resulting user contributed similarity score 132 can be calculated per step 120b as a number of TP divided by total judgements (TP/(TP+FP)). Moreover, the co-assigned U.S. patent application Ser. No. 15/467,362, filed March 23 and entitled "Expert-Assisted Online-Learning for Media Similarity" (the contents of which are incorporated herein by reference) disclosed a few ways in which the user contributed similarity scores 132 can be stored per step 120c (note: the way in which similarity feedback is stored is dependent upon how the question is posed to the annotator). In addition, there are various other methods discussed in the fields of Information Retrieval (e.g., Google Search) which could be used to implement the storing step 120c such as, for example, pairwise absolute precision, triad-based relative similarity, or ranked relevance.

In the second obtain operation 122, the apparatus 100 obtains collaborative filtering similarity scores 136 for the training items pairs 134, wherein each one of the collaborative filtering similarity scores 136 corresponds to one of the training item pairs 134 (i.e., each training item pair 134 has a corresponding collaborative filtering similarity score 136). In one example, the apparatus 100 can obtain the collaborative filtering similarity scores 136 as follows: (1) calculate the collaborative filtering similarity score 136 for each of the training item pairs 134 (step 122a); and (2) store the collaborative filtering similarity scores 136 in relation to their respective training item pairs 134 (step 122b). For instance, the apparatus 100 can calculate the collaborative filtering similarity scores 136 for training item pairs 134 per step 122a using a few types of input data such as, for example, users' ratings of items, and/or users' consumption behaviour. Generally speaking, if most users who watch X also watched Y, then X and Y will have a higher collaborative filtering similarity score 136 (note: an additional discussion about user contributed similarity scores 132 and collaborative filtering similarity scores 136 is provided near the end of the detailed description). There are several known methods for calculating collaborative filtering similarity scores 136 including (for example) a Jaccard Index, and the method described in B. M. Sarwar et. al. "Item-Based Collaborative Filtering Recommendation Algorithms" GroupLens Research Group/Army HPC Research Center, Department of Computer Science and Engineering University of Minnesota, May 2001 (the contents of which are incorporated herein by reference). It should be appreciated that the operation 122 does not need to follow operation 120 but instead the operation 122 could run in parallel with operation 120, or operation 122 could run prior to operation 120.

In the third obtain operation 124, the apparatus 100 obtains metadata 140 for each item 134 associated with the plurality of training item pairs 134 (note: the metadata 140 would be received at the input interface 104). The obtained metadata 140 for each item 134 can include one or more of the following (for example): (1) a title of the item 134; (2) a year of the item 134 (i.e., the year a movie 134 was first shown in public); (3) a genre of the item 134; (4) a writer of the item 134; and (5) plot keywords associated with the item 134. It should be noted that metadata 140 can refer to any description of the item 134, but the exact metadata 140 depends on the type of the item 134. In the example above, the item 134 was considered to be a movie while the title, the year, the genre, the writer, and the plot keywords are definitely relevant but even movies could also have metadata 140 that is related to language, countries of release, directors, producers, other personnel such as costume designers. TV series also has "series creators" etc. . . . In contrast, physical items can have metadata 140 like colour, and size. The inventors believe that the best predictors of metadata 140 for indicating similar movies (items) include genre, writer, and plot keywords, in this order.

In the train operation 126, the apparatus 100 trains the similarity model 102 using: (i) at least portion of the user contributed similarity scores 132 for the training item pairs 134; (ii) at least a portion a of the collaborative filtering similarity scores 136 for the training item pairs 134; and (iii) at least a portion of the metadata 140 for each item 134 associated with the training item pairs 134. In one example, the apparatus 100 can train the similarity model 102 as follows: (1) identify a portion of the training item pairs 134 suited for training the similarity model 102 (step 126a); (2) build a data structure 142 to store the user contributed similarity scores 132, the collaborative filtering similarity scores 136, and the metadata 140 for the items 134 included in the portion of the training item pairs 134 suited for training the similarity model 102 (step 126b); (3) train the similarity model 102 using a machine learning process (e.g., a multivariate multiple linear regression process) that utilizes two dependent variables and one or more independent variables all of which are obtained from the data structure 142, wherein the two dependent variables include (i) the user contributed similarity scores 132 for the portion of the training item pairs 134, and (ii) the collaborative filtering similarity scores 136 for the portion of the training item pairs 134, and the one or more independent variables include the metadata 140 for the items included in the portion of the training item pairs 134 (step 126c); and (4) store the trained similarity model 102 (step 126d) (see FIG. 5) (note: an additional discussion about training the similarity model 102 and the multivariate process is provided near the end of the detailed description). A more detailed discussion about features associated steps 126a, 126b, 126c, and 126d is provided next.

The apparatus 100 per step 126a identifies a portion of the training item pairs 134 suited for training the similarity model 102 based for example on a few criteria defined by an expert in the field. For example, the expert may want to use item pairs 134 (e.g., movie pairs 134) that have a sufficient amount of relevance feedback or similarity labels 133 collected in step 120a, as well as a good confidence of collaborative similarity (or dissimilarity) based on the calculated collaborative filtering similarity scores 136 from step 122a. The expert may also want items 134 (e.g., movies) that have been in a library for a certain number of days before considering those items 134 to be part of the training item pairs 134 that are used to train the similarity model 102.

The apparatus 100 per step 126b builds the data structure 142 (e.g., a matrix 142) to store the training data which includes the user contributed similarity scores 132, the collaborative filtering similarity scores 136, and the metadata 140 for the items 134 included in the portion of the training item pairs 134 suited for training the similarity model 102. FIG. 2 is a diagram that illustrates an exemplary data structure 142 (e.g., matrix 142) in accordance with an embodiment of the present disclosure. The exemplary data structure 142 (e.g., matrix 142) has multiple rows of IDs (only three rows 1, 2, and 3 are shown) each of which stores a pair of titles 134 (or a unique ID representing the pair of tiles 134) (in this example movie 1 and movie 2), the user contributed similarity score 132 for the pair of titles 134, and the collaborative filtering similarity score 136 for the pair of titles 134. The columns for Movie 1 and Movie 2 include the metadata 140 (titles) for the Independent Variable while the columns including the user contributed similarity score 132 and the collaborative filtering similarity score 136 are the Dependent Variables. In this example, it is shown in row 1 that the users (a.k.a. annotators) who submitted similarity labels 133 for the user contributed similarity score 132 believed that Batman Begins and The Dark Knight are similar. Likewise, the corresponding high collaborative filtering similarity score 136 indicates that those who enjoyed Batman Begins also enjoyed The Dark Knight. An assessment of row 2 shows that the users do believe that Batman Begins and Batman Returns are somewhat similar. Perhaps the users believed that these movies from a different decade and therefore not as similar as the comparison in row 1. However, the collaborative filtering similarity score 136 of row 2 shows that those who enjoyed Batman Begins also seemed to have enjoyed Batman Returns. Row 3 shows that the users believe these two movies are similar, but the collaborative filtering similarity score 136 shows that not all users who enjoyed Batman Begins also enjoyed Batman V. Superman. It should be appreciated that similarity need not be symmetric. That is, the similarity for example between Batman Returns and Batman Begins is not necessarily the same as the similarity between Batman Begins and Batman Returns, i.e., Similarity (M0001, M0002) need not be the same as Similarity (M0002, M0001). This example also highlights a benefit of the present disclosure towards the user experience where a similarity model which is based on user contributed similarity scores 132 alone would have ignored the user's preferences which are measured with the collaborative filtering similarity scores 136. Likewise, a similarity model built on collaborative filtering similarity scores 136 alone would have ignored user perceived similarity which are measured with user contributed similarity scores 132. FIG. 3 illustrates an expanded version of the exemplary data structure 142 (e.g., matrix 142) which includes additional the metadata 140 such as Title, Year, Director, and Writer as part of the Independent Variables. Note: FIG. 2 was meant to represent a high-level view of the data structure 142, an actual scenario where the similarity model 102 would be based on more metadata 140 could benefit from having the metadata 140 included or at least referenced in the data structure 142 as done in FIG. 3.

The apparatus 100 per step 126c trains the similarity model 102 using a machine learning process (e.g., a multivariate multiple linear regression process) that utilizes two dependent variables and one or more independent variables all of which are obtained from the data structure 102. The two dependent variables include (i) the user contributed similarity scores 132 for the portion of the training item pairs 134, and (ii) the collaborative filtering similarity scores 136 for the portion of the training item pairs 134. The one or more independent variable includes the metadata 140 for the items 134 included in the portion of the training item pairs 134. One example a machine learning process that uses two dependent variables is multivariate multiple linear regression where the term "multivariate" is because there is more than one DV and the term "multiple (or "multivariable")" is because there are multiple independent variables (e.g., Title, Year, Director, etc). If desired, this machine learning process may also use a feature-level similarity score per feature as an independent variable. For example, movie 1 and movie 2 may have a high feature-level similarity in the Director and Writer, but no similarity at all in the Title. While, movie 1 and movie 3 on the other hand may have some amount of similarity in the Title, and even Writer, but no similarity at all in the Director. This feature-level similarity score can be assessed per feature based on metrics which are often used in Information Retrieval such as TF-IDF, BM25, nDCG, or Jaccard Index among others. In the feature-level similarity score case, the specific machine learning process will depend on the inputs as some machine learning processes explicitly require a numeric input for the independent variable, while others machine learning processes may not. Further, some machine learning processes may allow a combination of features. For example, the Director and Producer columns may be combined and their similarity calculated based on this combined/synthetic column. In still yet another example, the apparatus 100 can produce a single synthetic measure for each training item pairs 134 by combing both the user contributed similarity score 132 and the collaborative filtering similarity score 136 into one synthetic score (E.g. SyntheticScore=UserScore 132 and collaborative filtering similarity score 136) to allow univariate methods to work and train the similarity model 102.

The apparatus 100 per step 126d stores the trained similarity model 102 to be used in the future to predict similarity between item pairs 144. The apparatus 100 may constantly, incrementally, and/or periodically update the similarity model 102 per steps 126a, 126b, 126c because both the user contributed similarity scores 132 and the collaborative filtering similarity scores 136 may be constantly updated or added. For instance, the user contributed similarity scores 132 can be updated in batches or online whenever more similarity labels 133 (annotations 133) are received for the previous training item pairs 134 or for new training item pairs 134. The collaborative filtering similarity scores 136 can be updated whenever collaborative signals are received, such as when consumers watch or rate a movie 134.

In the third obtain operation 128, the apparatus 100 obtains items 144 which can be one or more of the following: (i) items 144 that do not have enough user-contributed similarity labels 133; and (ii) items 144 that have recently been added and the apparatus 100 does not have knowledge of their consumption to be able to calculate corresponding collaborative filtering similarity scores 136.

In the use operation 130, the apparatus 100 uses the similarity model 102 to estimate similarity scores 146 for pairs of the items 144. More specifically, the apparatus 100 inputs the items 144 into the similarity model 102 which then outputs the similarity scores 146 for pairs of the items 144. That is, this procedure can be characterized as follows first a machine learning activity (or artificial intelligence activity) is used to build the similarity model 102 with a subset of data (i.e., training data pairs 134) and then the built similarity model 102 is used on the entire item library (i.e., items 144). In doing this, the apparatus 100 will build a dataset of how similar each item 144 is from each other item 144. This process can be optimised if desired, so that any item's top-N most similar items 144 are stored only. The list of top-N items 144 can be sorted by any predetermined value, including a single similarity score, or with Learning-to-Rank techniques.

Figure 4:
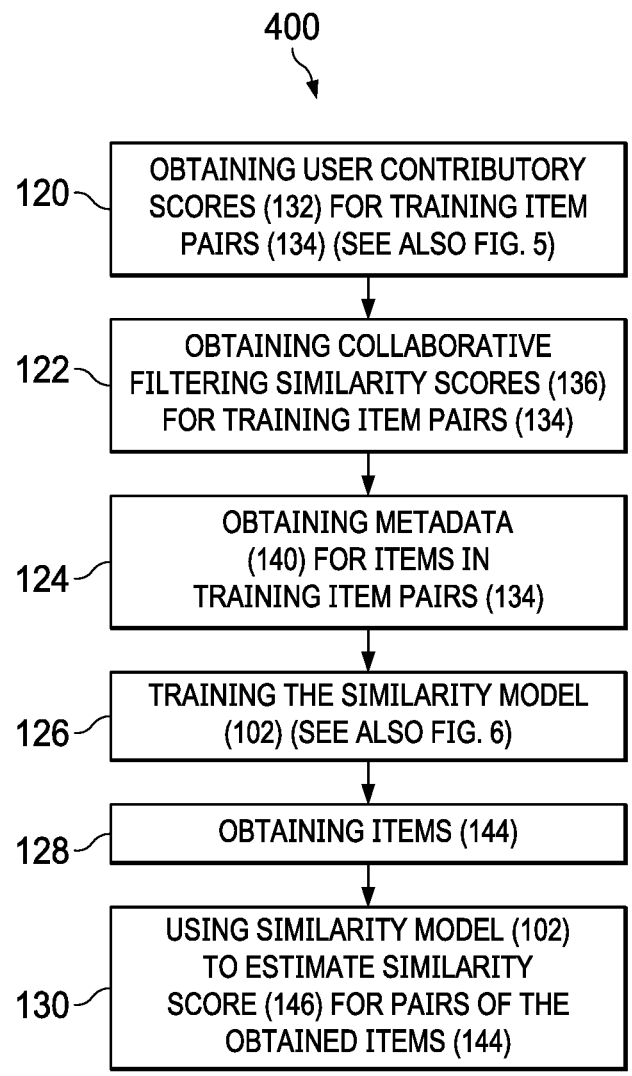
FIG. 4 is a flowchart of a method implemented in the apparatus for training a similarity model that is then used to predict similarity between items in accordance with an embodiment of the present disclosure.

Referring to FIG. 4, there is a flowchart of a method 400 implemented in the apparatus 100 for training a similarity model 102 that is then used to predict similarity between items 144 in accordance with an embodiment of the present disclosure. At step 120, the apparatus 100 obtains user contributed similarity scores 132 for training item pairs 134, wherein one of the user contributed similarity scores 132 corresponds to one of the training item pairs 134 (see FIG. 5). At step 122, the apparatus 100 obtains collaborative filtering similarity scores 136 for the training items pairs 134, wherein one of the collaborative filtering similarity scores 136 corresponds to one of the training item pairs 134. At step 124, the apparatus 100 obtains metadata 140 for each item 134 associated with the plurality of training item pairs 134. At step 126, the apparatus 100 trains the similarity model 102 using: (i) at least portion of the user contributed similarity scores 132 for the training item pairs 134; (ii) at least a portion of the collaborative filtering similarity scores 136 for the training item pairs 134; and (iii) at least a portion of the metadata 140 for each item 134 associated with the training item pairs 134 (see FIG. 6). At step 128, the apparatus 100 obtains items 144. At step 130, the apparatus 100 uses the trained similarity model 102 to estimate similarity scores 146 for pairs of the items 144. A more detailed discussion about steps 120, 122, 124, 126, 128, and 130 has been provided above with respect to the descriptions of FIGS. 1-3.

Referring to FIG. 5, there is a flowchart of a method 500 illustrating exemplary steps associated with the obtaining step 120 of FIG. 4 in accordance with an embodiment of the present disclosure. At step 120a, the apparatus 100 collects similarity labels 133 from users (annotators) for each of the training item pairs 134. At step 120b, the apparatus 100 uses the collected similarity labels 133 to calculate the user contributed similarity score 132 for each of the training item pairs 134. At step 120c, the apparatus 100 stores the user contributed similarity scores 132 in relation to their respective training item pairs 134. A more detailed discussion about steps 120a, 120b, and 120c has been provided above with respect to the description of FIG. 1.

Referring to FIG. 6, there is a flowchart of a method 600 illustrating exemplary steps associated with the training step 126 of FIG. 4 in accordance with an embodiment of the present disclosure. At step 126a, the apparatus 100 identifies a portion of the training item pairs 134 suited for training the similarity model 102. At step 126b, the apparatus 100 builds a data structure 142 to store the user contributed similarity scores 132, the collaborative filtering similarity scores 136, and the metadata 140 for the items 134 included in the portion of the training item pairs 134 suited for training the similarity model 102 (see FIGS. 2-3). At step 126c, the apparatus 100 trains the similarity model 102 using a machine learning process (e.g., a multivariate multiple linear regression process) that utilizes two dependent variables and one or more independent variables all of which are obtained from the data structure 142, wherein the two dependent variables include (i) the user contributed similarity scores 132 for the portion of the training item pairs 134, and (ii) the collaborative filtering similarity scores 136 for the portion of the training item pairs 134, and the one or more independent variables include the metadata 140 for the items 134 included in the portion of the training item pairs 134. At step 126d, the apparatus 100 stores the trained similarity model 102 (step 126d). A more detailed discussion about steps 126a, 126b, 126c, and 126d has been provided above with respect to the description of FIGS. 1-3.

Referring to FIG. 7, there is a block diagram illustrating structures of an exemplary apparatus 100 in accordance with an embodiment of the present disclosure. In one embodiment, the apparatus 100 comprises a first obtain module 702, a second obtain module 704, a third obtain module 706, a train module 708, a fourth obtain module 710, and a use module 712. The first obtain module 702 is configured to obtain user contributed similarity scores 132 for training item pairs 134, wherein one of the user contributed similarity scores 132 corresponds to one of the training item pairs 134. The second obtain module 704 is configured to obtain collaborative filtering similarity scores 136 for the training items pairs 134, wherein one of the collaborative filtering similarity scores 136 corresponds to one of the training item pairs 134. The third obtain module 706 is configured to obtain metadata 140 for each item 134 associated with the plurality of training item pairs 134. The train module 708 is configured to train the similarity model 102 using: (i) at least portion of the user contributed similarity scores 132 for the training item pairs 134; (ii) at least a portion of the collaborative filtering similarity scores 136 for the training item pairs 134; and (iii) at least a portion of the metadata 140 for each item 134 associated with the training item pairs 134. The fourth obtain module 710 is configured to obtain items 144. The use module 712 is configured to use the trained similarity model 102 to estimate similarity scores 146 for pairs of the items 144. It should be appreciated that the apparatus 100 may also include other components, modules or structures which are well-known, but for clarity, only the components, modules or structures needed to describe the features of the present disclosure are described herein.

As those skilled in the art will appreciate, the above-described modules 702, 704, 706, 708, 710, and 712 may be implemented separately as suitable dedicated circuits. Further, the modules 702, 704, 706, 708, 710, and 712 can also be implemented using any number of dedicated circuits through functional combination or separation. In some embodiments, the modules 702, 704, 706, 708, 710, and 712 may be even combined in a single application specific integrated circuit (ASIC). As an alternative software-based implementation, the apparatus 100 may comprise a processor 110 (including but not limited to a microprocessor, a microcontroller or a Digital Signal Processor (DSP), etc . . . ) and a memory 112 (see FIG. 1). The memory 112 stores machine-readable program code that are executable by the processor 110 to cause the apparatus 100 to perform the steps of the above-described methods 400, 500 and 600.

In view of the foregoing discussion, one skilled in the art should readily appreciate that the apparatus 100 is configured to train the similarity mode 102 with (i) user contributed similarity scores 132 for training pair items 134, (ii) collaborative filtering similarity scores 136 for training pair items 134, and (iii) metadata 140 for items 134 in the training pair items 134. The trained similarity model 102 is then used to predict similarity for other items 144 which (a) do not have enough user-contributed labels 133, (b) are newly added and the apparatus 100 therefore has no knowledge of their consumption to calculate collaborative similarity, (c) both. It should be appreciated that the items 134 and 144 described herein can be a wide range of content such as (for example): movies, television series, songs, academic papers, and software or "apps". Basically, items 134 and 144 could include any form of goods or services. In this regard, the aforementioned movies, television series, songs, academic papers can be considered in the "goods" category, and specifically those that can be distributed via software. It should also be noted that the items 134 and 144 can be considered physical goods such as general items sold on Amazon, specific items such as wine or beer, and even services such as restaurants or holiday destinations. The apparatus 100 and methods 400, 500, and 600 described herein have many advantages some of which are as follows (for example):

Collaborative filtering similarity scores 136 only indicate if two items 134 (e.g., movies 134) are somehow related, so the apparatus 100 by also using of user contributed similarity scores 132 effectively confirms if the two items 134 (e.g., movies 134) are not just related, but also perceived to be similar by users.

The apparatus 100 does not suffer from the cold-start problem inherent with collaborative filters since the independent variable(s) used in the training (building) of the similarity model 102 will be the metadata 140 of the training item pairs 134, which is often included with the items 134.

The apparatus 100 does not suffer from the obviousness problem associated with content-based filtering which generally only finds the most obvious movies because the apparatus 100 uses input from collaborative-based filtering including the user contributed similarity scores 132 and the collaborative filtering similarity scores 136 along with the metadata 140 (associated with content-based filtering) of the training item pairs 134 to train the similarity model 102. The use of the user contributed similarity scores 132 and the collaborative filtering similarity scores 136 should address the obviousness problem since there should be items 134 (movies 134) which are co-consumed despite not having too similar metadata 140.

As discussed in the background section, since CB (content-based filtering) generally requires ground truth, most known methods for training a similarity model only use one dependent variable. In contrast, the apparatus 100 uses two dependent variables (i.e., the user contributed similarity scores 132 and the collaborative filtering similarity scores 136) as ground truth and one or more independent variables (i.e., metadata 140). It should be noted that submission bias can only affect one DV, i.e. the user contributed similarity scores 132, making the present disclosure's apparatus 100 and method 400 more resilient when user contributed labels are not present.

The apparatus 100 does not need too many similarity labels 133 since the user contributed similarity scores 132 (based on the similarity labels 133) are augmented with the collaborative filtering similarity scores 136 which is almost guaranteed to result in a higher coverage. Further, user bias that can be associated with the user contributed similarity scores 132 is tempered (reduced) by the collaborative filtering similarity scores 136. Note: the number of similarity labels 133 needed can be considered in terms of Yield where X labels gives Y precision. This is just an example, but in the movie domain with 30000 movies, collecting 4000 labels could result in this estimate: CB alone gives a precision of 63-68% while the apparatus 100 could give a precision of about 72-77%.

The apparatus 100 is an improvement over the aforementioned traditional hybrid recommender systems which are hybridised in the input (IV) and not the output (DV). The apparatus 100 focuses on the hybridization of the output or DV, where the features of an item are used as the IV to predict both CB similarity and CF similarity.

While the advantages discussed above removes the problems mentioned in the background section, another advantage is that the apparatus 100 and the associated methods 400, 50 and 600 provide a better user experience. The apparatus 100 will use machine learning to train the similarity model 102 as described herein which will result in recommending items that will be more 'correct' to the users, by only returning items which users will perceive to be similar. Further, the inventors understand that humans generally use a dual-process model to infer similarity, it therefore only makes sense that the disclosed apparatus 100 and methods 400, 500, and 600 also use a dual-process as represented by content-based similarity and collaborative similarity to infer overall similarity and make recommendations to users. More specifically, the apparatus 100 and methods 400, 500 and 600 have uniquely used CB methods to represent taxonomic similarity and at same time used CF methods to represent thematic similarity (note: the inventors believe that when CF is used to represent thematic similarity it results in somewhat accurate recommendations but not a perfect result because CF will retrieve items that are both thematically and taxonomically similar). For example, in the present disclosure the CB and CF methods can be combined as follows: DirectorSimilarity+GenreSimilarity+ . . . +WriterSimilarity=[CF Similarity, CB Similarity]. The present disclosure is a marked-improvement over prior art methods.

User Contributed Similarity Scores 132 and Collaborative Filtering Similarity Scores 136

As discussed above, a process to obtain user-contributed similarity scores 132 can be through explicit feedback where a group of users explicitly label 133 if items (e.g., movies) are similar. For instance, the users may be shown a user interface which ask the users to find similar movies to Superman Returns (2006) (for example) and the same interface shows the user different movies such as, for example, Superman (1978), Superman II (1980), Man of Steel (2013), Superman III (1983), Justice League: Crisis on Two Earths (2010), Superman IV (1987), Fantastic 4 (2007), and Hulk (2003). The users can interface with the different displayed movies and use a binary notation (yes similar, not similar) to indicate the different displayed movies similarity (or not) to Superman Returns (2006). The binary notation means that users can supply feedback labels 133 to say if the item pairs (e.g., Superman Returns and Superman etc . . . ) are similar with the checkmark or not similar with the X mark. If desired, the user interface can additionally allow the user to skip a movie (e.g., Fantastic 4 etc . . . ) if they are unsure of that movie's similarity to Superman Returns. Thus, if five users are given this user interface, and three users say Superman Returns (2006) is similar to Superman (1978), while another two users say it is not, then the pair of Superman Returns (2006)—Superman (1978) has a precision of (3/5)=0.6. If from this same group of users (or different group, or group with some of same members but some different members), four users say that Man of Steel (2013) is similar while another user says it's not, then the pair of Superman Returns (2006)—Man of Steel (2013) has a precision of (4/5)=0.8. Therefore, it can be said that Man of Steel (2013) is more similar to Superman Returns (2006) than Superman (1978)

As discussed above, collaborative filtering similarity scores 136 depend on the user behaviour, such as user ratings or consumption (e.g., user-item relationships 136a). Assume the same Video on Demand system, where there are 100 users who have watched Superman Returns (2006). Of these 100 users, 30 also watched Superman (1978), while 50 also watched Man of Steel (2013). By one calculation, one can say that the collaborative similarity for Superman Returns (2006)-Superman (1978) is 30/100=0.3 while Superman Returns (2006)—Man of Steel (2013) is 50/100=0.5. One can therefore say that Man of Steel (2013) is more similar to Superman Returns (2006) than Superman (1978).

The received user-item relationships 136a and the collaborative filtering similarity scores 136 are strongly related, but still have some difference as discussed below. The user-item relationships 136a indicates how a user is related to an item based on consumption habits, while the CF similarity score 136 indicates the similarity between two items which is calculated based on user-to-item relationship 136a. The CF similarity score 136 is generally derived from a user-item relationship 136a. For example, a user-item-relationship 136a could be described as below with respect to TABLE #1:

TABLE #1

| User | Item | Ratings |
| --- | --- | --- |
| Alice | Batman Begins | 5 |
| Alice | Batman Begins | 4 |
| Alice | Titanic | 2 |
| Alice | About a Boy | 1 |
| Bob | Batman Begins | 2 |
| Bob | Batman Begins | 1 |
| Bob | Titanic | 5 |
| Bob | About a Boy | 4 |

The example above uses 5-star explicit ratings, but it is possible to use implicit ratings as well. For example if a person binge-watches a TV series, it is fair to say they liked the TV series, conversely if they watched a couple of episodes then dropped off it is fair to say they did not like the TV series. Based on these user-to-item relationships 136a, one can infer a CF similarity score 136. From the above example, one can see that users who loved Batman Begins also loved Batman Returns, and conversely those who hated Batman Begins hated Batman returns. One can therefore say that the two are related. The same goes for Titanic and About a Boy. The methods for obtaining CF similarity scores 136 from user-item relationships 136a are known see (for example): (1) B. M. Sarwar et. al. "Item-Based Collaborative Filtering Recommendation Algorithms" GroupLens Research Group/Army HPC Research Center, Department of Computer Science and Engineering University of Minnesota, May 20011 (note: the contents of this document are hereby incorporated herein by reference);

(2) "Collaborative recommendations using item-to-item similarity mappings", U.S. Pat. No. 6,266,649 B1 (note: the contents of this document are hereby incorporated herein by reference); (3) Hui-Feng Sun et al. "JacUOD: A New Similarity Measurement for Collaborative Filtering" Journal of Computer Science and Technology 27(6): 1215-1260 November 2012 (note: the contents of this document are hereby incorporated herein by reference); and (4) Haifeng Liu et al. "A new user similarity model to improve the accuracy of collaborative filtering" Knowledge-Based Systems 56 (2014) pages 156-166 (note: the contents of this document are hereby incorporated herein by reference) (see also the Jaccard similarity discussed above). In view of the foregoing, there two things to note: (1) CF similarity score 136 and user-item relationships 136a are different; and (2) CF similarity score 136 can be inferred from user-item relationships 136a.

Training-Using the Similarity Model 102 i. Unsupervised CB

One way to calculate similarity between two items is as the sum of the similarity between their features. In the domain of movies, one can consider features including writer, director, title, year of release, and so on. For example: Batman Begins (2005)—The Dark Knight (2008)

Title Similarity: 0.0
Year Similarity: 3
Director Similarity: 1.0
Writer Similarity: 0.33

In this example, the Overall Similarity=Title Similarity+ Year Similarity+Director Similarity+Writer Similarity can be represented as follows:

$$S_{overall}=S_{title}+S_{year}+S_{director}+S_{writer}=(0.0+3+1.0+0.33)=4.33 \quad \text{(eq. 1)}$$

However this example discounts the relative importance of each feature towards the overall similarity metric. To address this, one can include a weight (W) or coefficient for each feature as follows:

$$S_{overall}=W_{title} \times S_{title}+W_{year} \times S_{year}+W_{director} \times S_{director}+W_{writer} \times S_{writer} \quad \text{(eq. 2)}$$

In the unsupervised CB approach, the weight of each feature is predetermined by the authors or based on domain knowledge.

ii. Supervised CB

In the supervised CB approach, one can build a similarity model if desired based on one DV. This similarity model could include the weights of each metadata. The weights can be discovered through statistics or machine learning, such as using a multiple linear regression. In this example, the Independent Variables could be $S_{title}$, $S_{year}$, $S_{director}$, $S_{writer}$ and the DV could be the user contributed similarity scores 132. In this case, the training model could be built dependent on the number of item pairs that have user contributed similarity. Further, if desired the DV can be changed to collaborative filtering similarity scores 136, so that there is no need for user-contributed similarity score 132. In both supervised CB methods discuss above, there is only one DV. The first method calculated the weights based on user contributed similarity, while the second calculated the weights based on user behaviour.

After the training model is built with one DV it can be used for prediction. In the above, assume the first case of user-contributed similarity scores 132 where two movies are provided, the trained model can predict how similar users would perceive these movies to be. In the second case, given the two movies, the trained model can use the collaborative filtering similarity scores 136 to predict how many of those who watch movie A would also watch movie B.

It should be appreciated that the IVs (e.g., $S_{title}$, $S_{year}$, $S_{director}$, $S_{writer}$) affect the DV. If the user contributed similarity scores 132 or the collaborative filtering similarity scores 136 of any feature increases, there will be a direct increase to the DV which is the overall similarity score. The weight of that feature will decide just how much the increase in the IV will affect the DV.

iii. Multivariate Methods

As discussed above, the similarity model 102 of the present disclosure is built (trained) using both user contributed similarity scores 132 and collaborative filtering similarity scores 136 simultaneously as two DVs. Since there are two DVs (as opposed to one DV discussed above), given the two movies 144 and its metadata 140, the trained model 102 would simultaneously predict two DVs. i.e. the single method would predict how users would perceive the similarity of these two movies, and how many of those who watch movie A would also watch movie B. One way to accomplish this is with Multivariate Linear Regression, which will provide the weights that will allow this prediction. However various other methods could be used including Principal Component Analysis (PCA) or latent variable methods.

iv. Exemplary Training and Using a Similarity Model 102

The following discussion which is associated with FIGS. 8A-8F is provided to explain one way to train (build) the similarity model 102 using IVs and two DVs and then explain different ways on how to use the trained similarity model 102 in accordance with an embodiment of the present disclosure. To explain how the similarity model 102 per the present disclosure can be trained first assume where a similarity model is only trained for movies 134 with metadata 140 and user contributed similarity scores 132. In this case, the IVs are the movies 134 and their associated metadata 140 while the DV is the user contributed similarity scores 132. The associated data structure 142 for this training data is shown in FIG. 8A in which this data structure 142 is similar to one shown in FIG. 3 but without the column containing the collaborative filtering similarity scores 136. In this case, a similarity model can be trained on any pairs of items 134 (including the three shown in IDs 1, 2, and 3) that have the user contributed similarity scores 132.

Now assume there is a new movie Wonder Woman (2017) (M0005) 144 that is to be compared to Batman Begins (2005) (M0001) 134 which is shown in ID4 (row 4) of FIG. 8B but this pair of Batman Begins (M0001) 134 and Wonder Woman (M0005) 144 does not have a user contributed similarity score 132. The apparatus can use the knowledge based on the first three rows 1, 2, and 3 to predict the user contributory score 132 for row 4. For example, the similarity model ($M_a$) is trained based on rows 1-3 and any other rows that have user contributed similarity scores 132. Then, the similarity model ($M_a$) is used to predict the similarity between Batman Begins (M0001) and Wonder Woman (M0005) 144.

Now assume there is a similarity model that is only trained with metadata 140 and collaborative filtering similarity scores 136. In this case, the IVs are the movies 134 and their associated metadata 140 while the DV is the collaborative filtering similarity scores 136. The associated data structure 142 for this training data is shown in FIG. 8C in which this data structure 142 is similar to one shown in FIG. 3 but without the column containing the user contributed similarity scores 132. In this case, a similarity model can be trained on any pairs of items 134 (including the three shown in IDs 1, 2, and 3) that have the collaborative filtering similarity scores 136.

Now assume there is a new movie The Avengers (2012) (M0006) 144 that is to be compared to Batman Begins (2005) (M0001) 134 which is shown in ID4 (row 4) of FIG. 8D but this pair of Batman Begins (M0001) 134 and The Avengers (M0006) 144 does not have a collaborative filtering similarity score 136 because The Avengers (M0006) 144 is a new movie that was just added to the system. The apparatus can use the knowledge based on the first three rows 1, 2, and 3 to predict the collaborative filtering similarity score 136 for row 4. For example, the similarity model ($M_b$) is trained based on rows 1-3 and any other rows that have collaborative filtering similarity scores 136. Then, the similarity mode ($M_b$) is used to predict the similarity between Batman Begins (M0001) 134 and The Avengers (M0006) 144.

In the above examples associated with FIGS. 8A-8D, there is only one DV, while the present disclosure is concerned with two DVs as discussed above with respect to FIG. 3. Referring back to the examples above, assume there is a desire to predict the similarity between Batman Begins (M0001) 134 and Wonder Woman (M0005) 144 as per FIG. 8B, and predict the similarity between Batman Begins (M0001) and The Avengers (M0006) 144 as per FIG. 8D. However, as shown in FIGS. 8E-1 and 8E-2 let's consider that for M0001-M0005 (row 4) we still do not have the user contributed similarity score 132 just like FIG. 8B, but we do have the collaborative filtering similarity score 136 (e.g., 0.92). And, for M0001-M0006 (row 5) we still do not have the collaborative filtering similarity score 136 just like FIG. 8D, but we do have the user contributed similarity score 132 (e.g., 0.67).

As shown in FIGS. 8E-1 and 8E-2, we have two DVs namely the user contributed similarity scores 132 and collaborative filtering similarity score 136. Rows 4 and 5 are item pairs that have only one of the DVs. Row 6 which has item pair Batman Begins (M0001) 134-Justice League (M0007) 144 has neither of the DVs. The apparatus 100 can train a similarity model ($M_c$) 102 on the item pairs that have both DVs present namely rows 1-3 and then use the trained similarity model ($M_c$) 102 to simultaneously predict the DVs for the item pairs in each of rows 4, 5 and 6 as shown in FIGS. 8F-1 and 8F-2. The trained similarity mode ($M_c$) 102 may consider the current value of DV if it already exists, or may ignore it and produce its own predicted value.

As shown in FIGS. 8F-1 and 8F-2, it is possible for the similarity model ($M_c$) 102 to produce predictions that are different from the actual DVs, e.g. see row 4's collaborative filtering similarity score 136 and row 5's user contributed similarity scores 132. In this case, the apparatus 100 can decide on a few resolution methods, including simply using the actual values, simply using the predicted value, or finding a harmonic balance between the two, such as by using a weighted or regularized scheme. The inventors have found that it is preferred to use the actual value whenever available.

The next step is to display the list of similar items to the user, ordered by similarity. A few strategies can be used to accomplish this. For example, one strategy is to sort by a single DV, in which case the apparatus 100 can sort the movies based on user contributed similarity scores 132 (e.g., M0005, M0002, M0004, M0007, M0006, M0003) or based on collaborative filtering similarity score 136 (e.g., M0005, M0002, M0003, M0007, M0006, M0004). Another exemplary strategy (like the synthetic score approach discussed above) is to sort by a combined score, where some mathematical function that takes both the DVs and outputs a combined similarity score based on addition or multiplication of the raw scores, or the score based on its position in the distribution, e.g. quantile or z-score. For example, in this exemplary strategy the apparatus 100 can produce a single synthetic measure for each training item pairs 134 by combing both the user contributed similarity score 132 and the collaborative filtering similarity score 136 into one synthetic score (e.g., SyntheticScore=UserScore 132 and collaborative filtering similarity score 136) to allow univariate methods to work and train the similarity model 102. Yet another strategy is to use a "serpentining" scheme or "zig-zag" scheme, where the top similar item based on one DV is shown, followed by the top from the other DV, followed by the second item from the first DV and so on. Any item already shown in the output is ignored. In the present example, the apparatus 100 could start with displaying the highest scoring item from user-contributed similarity followed by displaying the highest scoring item from collaborative similarity and so on. Since the top two items in both DVs are the same, the apparatus 100 would move on to the next item. Therefore, in the present example the output will look like so: M0005, M0002, M0004, M0003, M0007, M0006.

Although the described solutions may be implemented in any appropriate type of system supporting any suitable communication standards and using any suitable components, particular embodiments of the described solutions may be implemented in a network that includes a server or a collection of servers, a network such as the Internet, local area network, or wide area network, and at least one client. The apparatus 100 can be implemented by a data processing system. The data processing system can include at least one processor that is coupled to a network interface via an interconnect. The memory can be implemented by a hard disk drive, flash memory, or read-only memory and stores computer-readable instructions. The at least one processor executes the computer-readable instructions and implements the functionality described above. The network interface enables the data processing system to communicate with other nodes (e.g., a server or a collection of servers, other clients, etc.) within the network. Alternative embodiments of the present invention may include additional components responsible for providing additional functionality, including any functionality described above and/or any functionality necessary to support the solution described above.

Those skilled in the art shall appreciate that the term "and/or" user herein is used to mean at least one of A, B, and C. Further, those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. An apparatus for training a similarity model that is used to predict similarity between items, the apparatus comprising:
   processing circuitry;
   memory containing instructions executable by the processing circuitry whereby apparatus is operative to:
   obtain a plurality of user contributed similarity scores for a plurality of training item pairs, wherein one of the user contributed similarity scores corresponds to one of the training item pairs;
   obtain a plurality of collaborative filtering similarity scores for the plurality of training item pairs, wherein one of the collaborative filtering similarity scores corresponds to one of the training item pairs;
   obtain metadata for each item associated with the plurality of training item pairs;
   train the similarity model using: (1) at least portion of the user contributed similarity scores for the training item pairs; (2) at least a portion a of the collaborative filtering similarity scores for the training item pairs; and (3) at least a portion of the metadata for each item associated with the training item pairs;
   obtain items; and
   use the similarity model to estimate a plurality of similarity scores for a plurality of pairs of the obtained items.

2. The apparatus of claim 1, wherein the instructions are such that the apparatus is operative to obtain the plurality of user contributed similarity scores for a plurality of training item pairs by:
   collecting similarity labels from users for each of the training item pairs;
   using the collected similarity labels to calculate the user contributed similarity score for each of the training item pairs; and
   storing the plurality of user contributed similarity scores for the plurality of training item pairs.

3. The apparatus of claim 1, wherein the instructions are such that the apparatus is operative to obtain the plurality of collaborative filtering similarity scores for the plurality of training items pairs by:
   calculating the collaborative filtering similarity scores for each of the training item pairs; and,
   storing the plurality of collaborative filtering similarity scores for the plurality of training item pairs.

4. The apparatus of claim 1, wherein the obtained metadata for each item comprises:
   a title of the item;
   a year of the item;
   a genre of the item;
   a writer of the item; and/or
   plot keywords associated with the item.

5. The apparatus of claim 1, wherein the instructions are such that the apparatus is operative to train the similarity model by:
   identifying a portion of the training item pairs suited for training the similarity model;
   building a data structure to store the user contributed similarity scores, the collaborative filtering similarity scores, and the metadata for the items included in the portion of the training item pairs suited for training the similarity model;
   training the similarity model using a machine learning process that utilizes two dependent variables and one or more independent variables all of which are obtained from the data structure; wherein the two dependent variables include (1) the user contributed similarity scores for the portion of the training item pairs, and (2) the collaborative filtering similarity scores for the portion of the training item pairs; wherein the one or more independent variables include the metadata for the items included in the portion of the training item pairs; and
   storing the trained similarity model.

6. The apparatus of claim 5, wherein the instructions are such that the apparatus is operative to periodically re-train the similarity model utilizing updated user contribute similarity scores, updated collaborative filtering similarity scores, and updated metadata for updated training item pairs.

7. The apparatus of claim 5, wherein the data structure comprises a matrix with a plurality of rows where each one of the rows is associated with one of the training item pairs and includes:
   the metadata for two items in one of the training item pairs;
   the user contributed similarity score for the one of the training item pairs; and
   the collaborative filtering similarity score for the one of the training item pairs.

8. The apparatus of claim 5, wherein the machine learning is multivariate machine learning.

9. The apparatus of claim 1, wherein the obtained items include:
   items that do not have enough user-contributed similarity labels; and
   items that have recently been added and there is no knowledge of consumption of the recently added items to calculate collaborative filtering similarity scores.

10. A method, implemented by an apparatus, for training a similarity model that is used to predict similarity between items, the method comprising:
    obtaining a plurality of user contributed similarity scores for a plurality of training item pairs, wherein one of the user contributed similarity scores corresponds to one of the training item pairs;
    obtaining a plurality of collaborative filtering similarity scores for the plurality of training item pairs, wherein one of the collaborative filtering similarity scores corresponds to one of the training item pairs;

obtaining metadata for each item associated with the plurality of training item pairs;

training the similarity model using: (1) at least portion of the user contributed similarity scores for the training item pairs; (2) at least a portion a of the collaborative filtering similarity scores for the training item pairs; and (3) at least a portion of the metadata for each item associated with the training item pairs;

obtaining items; and using the similarity model to estimate a plurality of similarity scores for a plurality of pairs of the obtained items.

11. The method of claim 10, wherein the obtaining the plurality of user contributed similarity scores for a plurality of training item pairs comprises:

collecting similarity labels from users for each of the training item pairs;

using the collected similarity labels to calculate the user contributed similarity score for each of the training item pairs; and storing the plurality of user contributed similarity scores for the plurality of training item pairs.

12. The method of claim 10, wherein the obtaining the plurality of collaborative filtering similarity scores for the plurality of training item pairs comprises:

calculating the collaborative filtering similarity score for each of the training item pairs; and storing the plurality of collaborative filtering similarity scores for the plurality of training item pairs.

13. The method of claim 10, wherein the obtained metadata for each item comprises:

a title of the item;
a year of the item;
a genre of the item;
a writer of the item; and/or
plot keywords associated with the item.

14. The method of claim 10, wherein the training the similarity model comprises:

identifying a portion of the training item pairs suited for training the similarity model;

building a data structure to store the user contributed similarity scores, the collaborative filtering similarity scores, and the metadata for the items included in the portion of the training item pairs suited for training the similarity model;

training the similarity model using a machine learning process that utilizes two dependent variables and one or more independent variables all of which are obtained from the data structure; wherein the two dependent variables include (1) the user contributed similarity scores for the portion of the training item pairs; and (2) the collaborative filtering similarity scores for the portion of the training item pairs; and wherein the one or more independent variables include the metadata for the items included in the portion of the training item pairs; and storing the trained similarity model.

15. The method of claim 14, further comprising periodically re-training the similarity model utilizing updated user contribute similarity scores, updated collaborative filtering similarity scores, and updated metadata for updated training item pairs.

16. The method of claim 14, wherein the data structure comprises a matrix with a plurality of rows where each one of the rows is associated with one of the training item pairs and includes:

the metadata for two items in one of the training item pairs;

the user contributed similarity score for the one of the training item pairs; and the collaborative filtering similarity score for the one of the training item pairs.

17. The method of claim 14, wherein the machine learning is multivariate machine learning.

18. The method of claim 10, wherein the obtained items include:

items that do not have enough user-contributed similarity labels; and items that have recently been added and there is no knowledge of consumption of the recently added items to calculate collaborative filtering similarity scores.

* * * * *